W. RENFREW.
JEWELER'S CALIPERS.
APPLICATION FILED MAY 29, 1920.

1,410,123.

Patented Mar. 21, 1922.

Inventor:
William Renfrew,
by Walter E. Lombard.
Atty.

UNITED STATES PATENT OFFICE.

WILLIAM RENFREW, OF WATERTOWN, MASSACHUSETTS.

JEWELER'S CALIPERS.

1,410,123.   Specification of Letters Patent.   Patented Mar. 21, 1922.

Application filed May 29, 1920. Serial No. 385,379.

*To all whom it may concern:*

Be it known that I, WILLIAM RENFREW, a citizen of the United States of America, and a resident of Watertown, in the county of Middlesex and Commonwealth of Massachusetts, have invented certain new and useful Improvements in Jewelers' Calipers, of which the following is a specification.

This invention relates to devices adapted particularly for the use of jewelers in calipering precious stones in order to determine the size thereof preparatory to estimating their value.

The invention has for its object the provision of a simple but effective device of this character which is provided with a dial having divisions and characters thereon which may be used in connection with a specially prepared chart to determine the value of any particular precious stone by ascertaining with said device the depth and diameter of the stone.

The invention consists of a pair of calipers, one arm of which is preferably fixedly secured to a head and has an indicating dial thereon, the pointer of which is adapted to be actuated by a spring when released by the closing movement of the other arm pivoted to said head.

The invention further consists in certain novel features of construction and arrangement of parts which will be fully understood by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings.

Similar characters indicate like parts throughout the several figures of the drawings.

Figure 1:
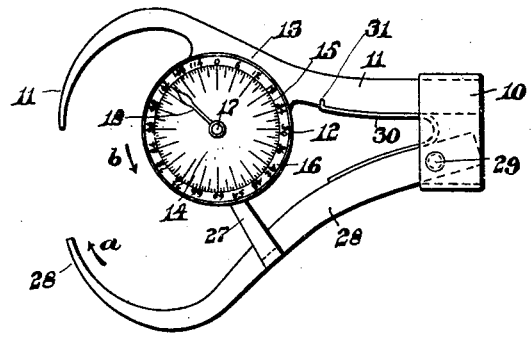
Figure 1 represents a plan of a device embodying the principles of the present invention.

In the drawings, 10 is a head piece having preferably fixedly secured thereto, a curved arm 11 provided with an inward extension or plate 12 to the upper face of which is secured a cylindrical casing 13.

This cylindrical casing 13 is closed by a dial 14 having a plurality of divisions 15 and characters 16 thereon.

Centrally disposed in the casing 13 and extending through the dial 14 is a revoluble shaft 17 having secured to its upper end a pointer 18.

The shaft 17 has an enlarged portion 19 within the casing 13 having a slot 20 extending therethrough to receive one end of a spiral spring 21 surrounding the enlarged portion 19 of the shaft 17.

The opposite end of the spiral spring 21 is fixedly secured in a stud 22 projecting upwardly from the bottom of the casing 13.

The shaft 17 has extending therethrough, a pin 23 to which is secured a flexible connector 24 the opposite end of which has an eye 25 coacting with a projection 26 upon a finger 27 secured to a movable arm 28 pivoted at 29 to said head 10.

Between the arms 11 and 28 is a spring 30 having one end bent outwardly and inserted in a notch 31 in the fixed arm 11, the central portion of said spring 30 extending into an opening formed in the head 10 to receive the ends of the arms 11 and 28.

This head 10 has a downwardly extending curved finger piece 32 by the aid of which the device may be more securely held in the hand of the operator when said device is in use.

Figure 2:
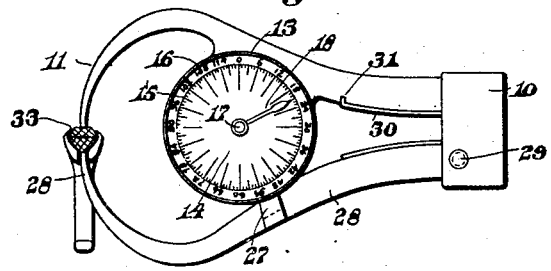
Figure 2 represents a similar view showing the device in use in measuring the size of a stone.
Figure 3:
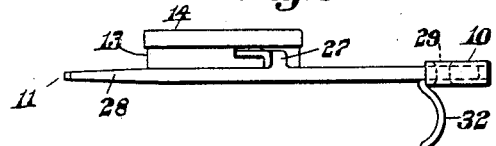
Figure 3 represents a side elevation of the device.
Figure 4:
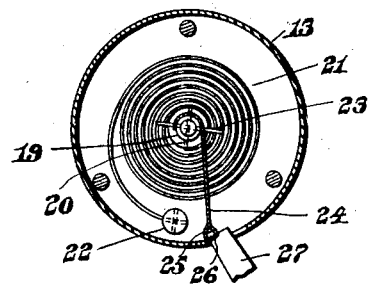
Figure 4 represents a horizontal section of the spring casing.
Figure 5:
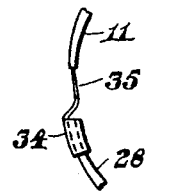
Figure 5 represents a detail showing a supplemental finger to be applied to the movable arm when calipering stones in certain settings.

The spring 30 normally retains the arms 11 and 28 separated as indicated in Fig. 1 of the drawings and when in this position the spiral spring 21 is coiled about the shaft 17 with greater tension than when the arms 11 and 28 are in the position indicated in Fig. 2 of the drawings.

It is obvious therefore that when the arm 28 is moved in the direction of the arrow *a* on Fig. 1, the releasing of the spring 21 will cause the pointer 18 to be moved in the direction of the arrow *b* on said Fig. 1.

The normal position of the pointer 18 is as indicated in Fig. 1 of the drawings but when the movable arm 28 is moved inwardly in the direction of the arrow *a* on Fig. 1, in order to caliper a precious stone 33, the pointer 18 will be moved in the direction of the arrow *b* on said Fig. 1 and indicate by means of the divisions 15 and figures 16 the exact depth of said stone in predetermined terms. The device is then used to caliper the diameter of said precious stone and secure by means of the divisions 15 and the figures 16 the exact diameter of said stone in predetermined terms. Having secured the diameter and depth of the stone in the predetermined terms, these readings are used in connection with a specially prepared chart which will designate the approximate weight of any particular stone which has previously been determined to be pure and without flaw.

When the approximate weight of the stone has been found, it is possible to readily estimate its approximate value.

With the indicator positioned adjacent the free end of one of the arms, the operator can readily see at the same time, the position of the points of the arms on the stone and the readings on the indicator.

The device as shown in Figs. 1 to 4 of the drawings may be used to caliper stones in ordinary rings but when it is desired to secure the depth of a stone in certain settings in which a very small opening is formed in the ring behind the stone, it is necessary to use a supplemental member 34 having an elongated projection 35 of very small diameter and of such a size as may be readily inserted into the opening in the ring in the rear of the stone.

Owing to the length of the projection 35, when the supplemental device 34 is used, an allowance is made from the readings of the indicator in an obvious manner, the length of said projection and the difference in movement of the pointer when said member 34 is used having been previously determined.

This makes a very simple and effective device for calipering precious stones and is very accurate.

It is believed that the operation and many advantages of the invention will be fully understood from the foregoing description.

Having thus described my invention, I claim—

1. In a device of the class described, a head piece; a curved arm extending therefrom; a coacting arm pivoted to said head; a spring interposed between said arms for normally separating them; a plate on one of said arms intermediate its ends and projecting toward the other arm; and means mounted on said plate for indicating the distance between the free ends of said arms.

2. In a device of the class described, a head piece; a curved arm fixedly secured thereto and extending therefrom; said arm having a plate intermediate its ends and projecting laterally therefrom; a coacting arm pivoted to said head; a spring interposed between said arms for normally separating them; and means mounted on said plate for indicating the distance between the free ends of said arms.

3. In a device of the class described, a head piece; a curved arm connected at one end to said head piece and extending therefrom; a coacting arm pivoted at one end to said head; a spring for normally separating said arms; a dial on one arm between its free end and said head piece; a pointer therefor movable about a pivot centrally disposed relatively to said dial; and means actuated by the inward movement of the other arm for moving said pointer.

4. In a device of the class described, a head piece; a curved arm extending therefrom; a coacting arm pivoted to said head; a spring for normally separating said arms; a casing on one arm; a dial thereon; a pointer for said dial; a pivot for said pointer centrally disposed in said casing; a spiral spring within said casing for actuating said pointer; and means controlled by the inward movement of the other arm for releasing said pointer spring and permitting movement of said pointer.

5. In a device of the class described, a head piece; a curved arm extending therefrom; a coacting arm pivoted to said head; a spring for normally separating said arms; a casing on one arm; a dial thereon; a pointer for said dial; a spiral spring within said casing for actuating said pointer; a finger on the other arm extending into said casing; a revoluble shaft to which said pointer is secured; and a flexible connection between said shaft and finger.

6. In a device of the class described, a head piece; a curved arm extending therefrom; a coacting arm pivoted to said head; a spring for normally separating said arms; a casing on one arm; a dial thereon; a pointer for said dial; a fixed stud on said casing; a shaft therefor centrally disposed in said casing; a spiral spring in said casing secured at one end to said shaft and at the other end to said fixed stud; and a flexible connection between the pointer shaft and the other arm.

7. In a device of the class described, a head piece having a recess in one end; a curved arm connected at one end thereto and extending therefrom, said arm being provided with a lateral projection; a coacting arm having an end in said recess and pivoted to said head; a spring for normally separating said arms; means mounted on said projection for indicating the distance between the free ends of said arms; and a downwardly extending finger piece on said head.

8. In a device of the class described, two arms connected together at one end and having their opposite ends tapered and normally separated, said arms being movable toward each other by the hand of the operator; and an indicator on one of said arms and controlled by the inward movement of the other arm, said indicator being positioned between said arms and intermediate the ends thereof.

9. In a device of the class described, two arms connected together at one end, the free ends of which are normally separated and movable toward each other; an expansion spring between said arms; an indicator dial on one arm adjacent the free end thereof; and a spring actuated pointer for said dial controlled by the inward movement of the other arm.

10. In a device of the class described, a head piece adapted to be held in the hand; two arms, one end of each being connected to said head piece, and the free ends of which are curved toward each other and normally separated, one of said arms being adapted to be moved toward the other; means for normally retaining said free ends separated; a cylindrical casing secured to one of said arms adjacent the free end thereof; a revoluble shaft centrally disposed in said casing; a dial on the upper end of said casing; a pointer coacting with said dial and mounted on said shaft; a spiral spring within said casing secured at one end to said pointer shaft and at the other end to a fixed stud; a finger projecting from the other arm into said casing; and a flexible member secured at one end to the inner end of said finger and at the other end to said pointer shaft, said member being adapted to be wound on said shaft when said arms are moved toward each other.

11. A calipering device adapted to be held in the hand and consisting of two arms connected together at one end with their opposite ends normally separated but adapted by hand pressure to be moved so that the free ends will contact with the object to be measured; an expansion spring between said arms; an indicator adjacent the free end of one arm; and a spring-actuated pointer dial for said dial controlled by the movement of one of said arms relatively to the other.

12. A calipering device adapted to be held in the hand and consisting of two arms connected together at one end with their opposite ends normally separated but adapted by hand pressure to be moved toward each other; an expansion spring between said arms; an indicator dial adjacent the free end of one arm and extending toward the other arm; a pointer for said dial; a shaft therefor; a spring for rotating said shaft; and a flexible member secured to and wound on said shaft with its other end secured to said other arm whereby said pointer is prevented from moving until the two arms are moved toward each other.

Signed by me at 746–7 Old South Bldg., Boston, Mass., this 27th day of May, 1920.

WILLIAM RENFREW.

Witnesses:
  WALTER E. LOMBARD,
  NATHAN C. LOMBARD.